US006276705B1

(12) United States Patent
Baldwin et al.

(10) Patent No.: US 6,276,705 B1
(45) Date of Patent: Aug. 21, 2001

(54) WHEELCHAIR HAND RIM

(76) Inventors: Mark Baldwin, 31 Welsford St., Floor #2, Pittsburgh, PA (US) 15206; Rory Cooper, 79 Kaufman Rd., Pittsburgh, PA (US) 15044; Michael Boninger, 5557 Woodmont St., Pittsburgh, PA (US) 15217; Al Vangura, Jr., 921 Mifflin Ave., Pittsburgh, PA (US) 15221; James F. Ster, 5001 Portia Ct., Carmichael, CA (US) 95608

( * ) Notice: Subject to any disclaimer, the term of this patent is extended or adjusted under 35 U.S.C. 154(b) by 0 days.

(21) Appl. No.: 09/266,161

(22) Filed: Mar. 10, 1999

(51) Int. Cl.[7] ..................... B62M 1/14
(52) U.S. Cl. ..................... 280/250.1; 280/304.1
(58) Field of Search ..................... 280/304.1, 250.1, 280/242.1; 297/DIG. 4; 74/552, 558

(56) References Cited

U.S. PATENT DOCUMENTS

| | | | | |
|---|---|---|---|---|
| 3,623,748 | * | 11/1971 | Haynes | 280/250.1 |
| 3,899,189 | * | 8/1975 | Watkins | 280/250.1 |
| 4,366,964 | * | 1/1983 | Farey et al. | 280/250.1 |
| 4,593,929 | * | 6/1986 | Williams | 280/650 |
| 4,687,218 | * | 8/1987 | Okamoto | 280/250.1 |
| 5,160,156 | * | 11/1992 | Mendon | 280/250.1 |
| 5,306,035 | * | 4/1994 | Counts | 280/304.1 |
| 5,791,672 | * | 8/1998 | Masclet | 280/304.1 |
| 5,927,739 | * | 7/1999 | Evling | 280/250.1 |

FOREIGN PATENT DOCUMENTS

| | | | | |
|---|---|---|---|---|
| 2008870 | * | 10/1987 | (RU) | 280/250.1 |
| 3610055 | * | 10/1987 | (DE) | 280/250.1 |

OTHER PUBLICATIONS

Julio Aljure, M.D., Ibrahim Eltorai, M.D., William E. Bradley, M.D., James E. Lin, M.D. and Bonnie Johnson, N.P. "Carpal Tunnel Syndrome in Paraplegic Patients" Paraplegia 23; International Medical Society of Paraplegia; pp. 182–186 (1985).

Marietta L. van der Linden, Linda Valent, H. E. J. Veeger and Luc H. V. van der Woude The Effects of Wheelchair Handrim Tube Diameter on Propulsion Efficiency and Force Application (Tube Diameter and Efficiency in Wheelchair IEEE Transactions on Rehabilitation Engineering: vol. 4,No. 3, pp. 123–132 (Sep. 1996).

Barbara A. Silverstein, Ph.D., Lawrence J. Fine, M.D. and Thomas J. Armstrong, Ph.D. "Occupational Factors and Carpal Tunnel Syndrome" American Journal of Industrial Medicine; vol. 11, pp. 343–358 (1987).

Charlotte Fransson and Jorgen Winkel "Hand Strength: The Influence of Grip Span and Grip Type" Ergonomics; vol. 34, No. 7, pp. 881–892 (1991).

Ronald F. Gaines, M.D. and William H. T. LA, Ph.D. "Users' Responses to Contoured Wheelchair Handrim" Journal of Rehabilitation Research and Development; vol. 23, No. 3, pp. 57–62 (Jul. 1986).

* cited by examiner

*Primary Examiner*—Daniel G. DePumpo

(57) ABSTRACT

A wheelchair hand rim that increases the mechanical efficiency of a pushrim by providing a better complement to the hand and decreasing the likelihood of secondary injuries. The present invention includes a first rim made of a light weight metal tube without any coating on its lateral or interior exterior surface, a concave trough between the first rim and the side of a wheel of a wheelchair, and an second rim made of a light weight metal tube, uncoated, having the same tube diameter of the first rim, and concentrically aligned within the first rim.

8 Claims, 6 Drawing Sheets

WHEELCHAIR HAND RIM

FIELD OF THE INVENTION

This invention relates to a novel pushrim for wheelchairs that increases biomechanical efficiency in propulsion and reduces the likelihood of injury to manual wheelchair users.

BACKGROUND OF THE INVENTION

The number of people in the world relying on manual wheelchairs for primary mobility has grown significantly in the past few decades and is approximated to be near 1.5 million in the United States alone. Secondary injuries such as carpal tunnel syndrome (CTS) are prevalent in manual wheelchair users (MWUs) with some studies finding up to 63% prevalence (Aljure, et al, "Carpel Tunnel Syndrome in Paraplegic Patients" Paraplegia 23; International Medical Society of Paraplegia (1985). Nonetheless, MWUs must use their arms in almost every daily activity and the option of a power wheelchair to prevent overuse injuries is often not economically feasible and undesirable for other reasons. Although there are several CTS-preventative propulsion devices commercially available (e.g., add-on lever crank devices), the high prevalence of injury remains. Further, the best clinical solution to relieve some of the injuries leave individuals unable to self-propel for extended periods of time. For example, the best resolution to CTS, carpal tunnel release surgery, often leaves an individual unable to self-propel or work for weeks and some times months. Thus, because of the limited options available, most MWUs ignore pain and trauma to their hands and arms during propulsion and continue the everyday activities, regardless of the risk of long-term harm. These phenomena have prompted research establishing a nexus between wheelchair propulsion biomechanics and highly prevalent secondary injuries.

In studies investigating secondary upper extremity injuries, the high prevalence of injuries has been attributed to over use of the arms during daily wheelchair propulsion. Many researchers believe the inefficient transmission of power from the hand to the pushrim is the phenomena predominantly responsible for nerve dysfunction in the upper extremities. For example, recent studies on wheelchair propulsion biomechanics relate CTS in MWUs to higher propulsion forces applied to the pushrim and to greater stroke frequency during wheelchair propulsion (Baldwin et al "A Relationship between Pushrim Kinetics and Median Nerve Dysfunction). Several studies on CTS in the able-bodied working population have found that long term exposure to high repetitious forces to the hand and wrist can cause CTS (Silverstein et al, "Occupational Factors and Carpal Tunnel Syndrome" American Journal of Industrial Medicine; Vol. 11 (1987)).

Current commercially available wheelchair pushrims, 10, are typically made of aluminum tubing with a tube diameter, 11, of ¾", a 21" overall rim diameter, 12, and typically positioned ½" or ⅝" away from the wheel, 13, as shown in FIGS. 1*a* and 1*b*. A high friction vinyl coated pushrim also exists that has dimensions similar to those of the standard rims.

Unfortunately, the tube diameter, 11, of standard pushrims is too small to allow complete grip between the palm of the hand and the fingers. This creates a number of problems. First, it reduces the contact area between the hand and the pushrim, which increases the pressure on the contact points of the hand, and increases the forces transmitted to the delicate structures of the hand. Second, the inability to grip the pushrim with the entire palm and fingers reduces the mechanical efficiency by recruiting muscles for stabilization on the rim instead of delivering power to the wheelchair. Thus, the decreased mechanical efficiency and increased forces while using standard pushrims may contribute to developing secondary injuries like CTS.

Accordingly, it is an object of the present invention to provide a pushrim that reduces higher pushrim forces. It is a further object of this invention to decrease the propulsion frequency. It is another object of this invention to increase the mechanical efficiency of a pushrim by providing a better fit to the hand. It is also an object of this invention to decrease the likelihood that an individual will develop injuries including CTS.

DETAILED DESCRIPTION OF THE INVENTION

Figure 2A:
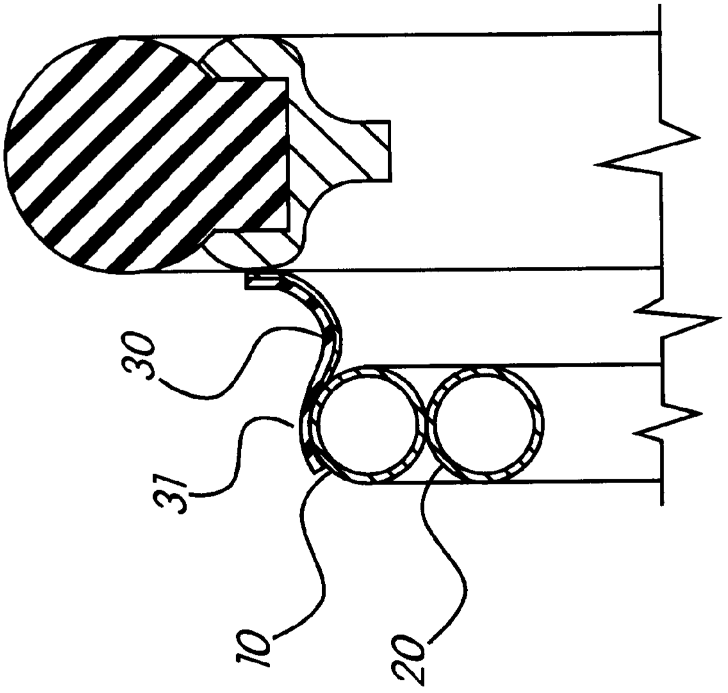
FIG. 2*a* is a front cross section review of a first preferred embodiment.
Figure 1A:
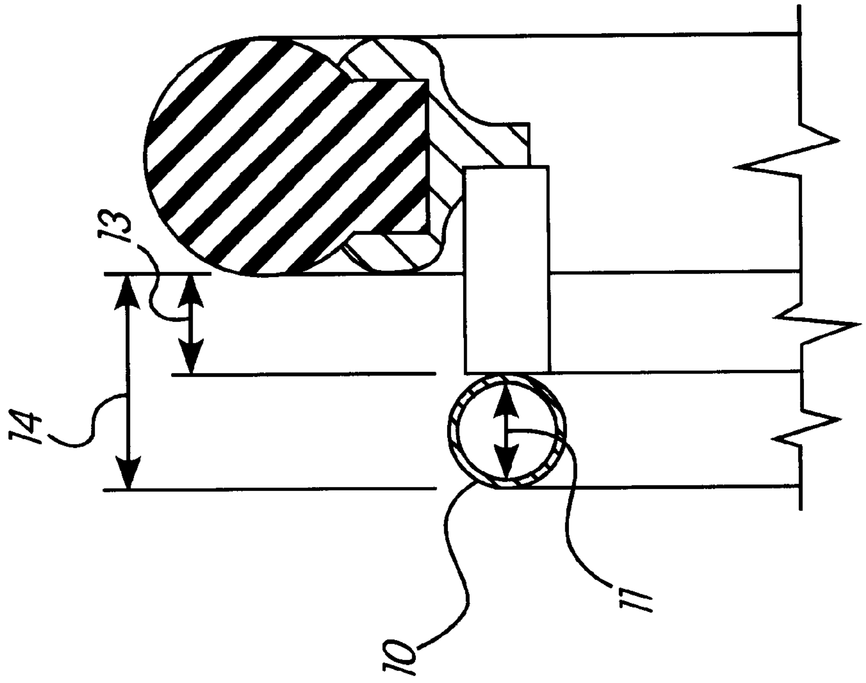
FIG. 1A (Prior Art)
FIG. 1*a* is a front cross section view of a standard wheelchair rim.
Figure 1B:
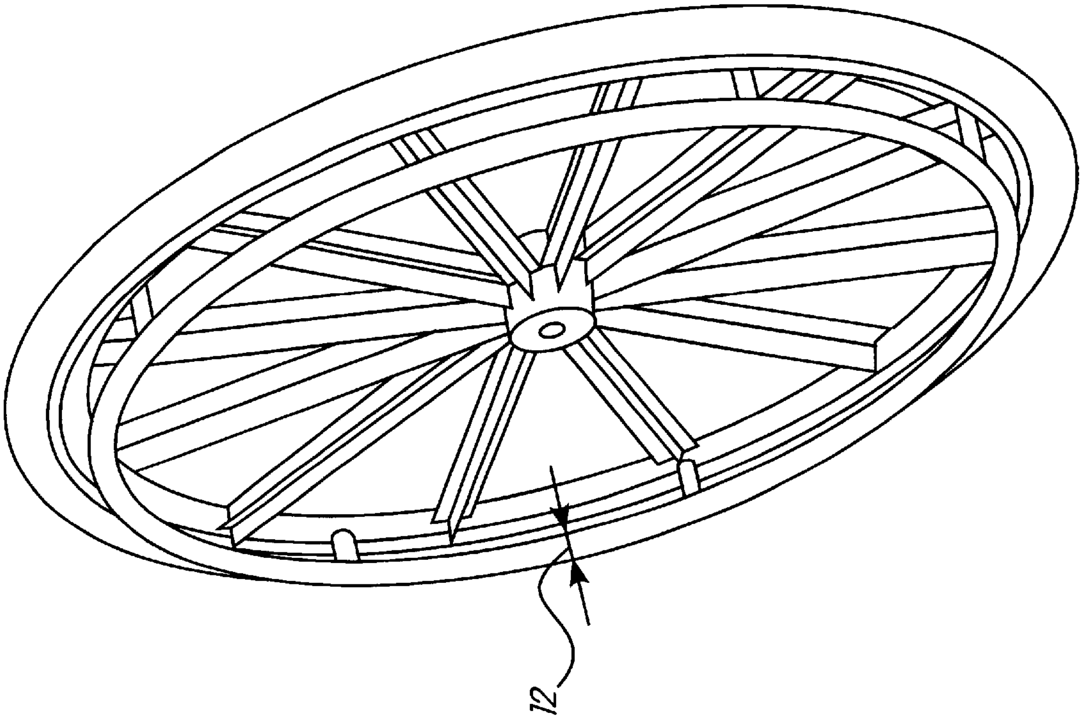
FIG. 1B (Prior Art)
FIG. 1*b* is an oblique frontal view of a standard wheelchair rim.
Figure 2B:
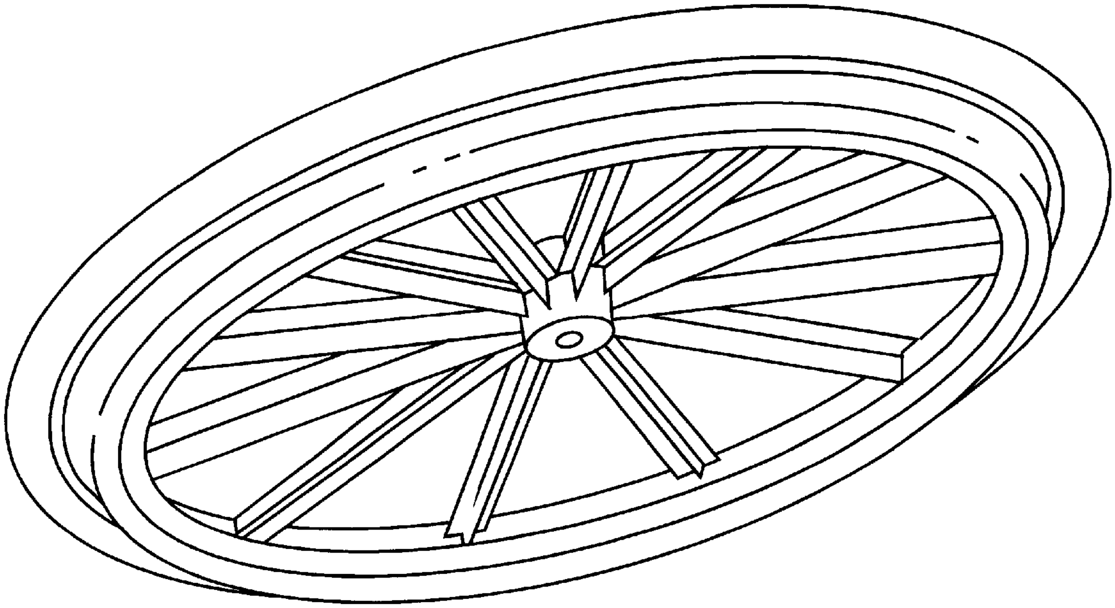
FIG. 2*b* is an oblique frontal view of a first preferred embodiment.
Figure 3A:
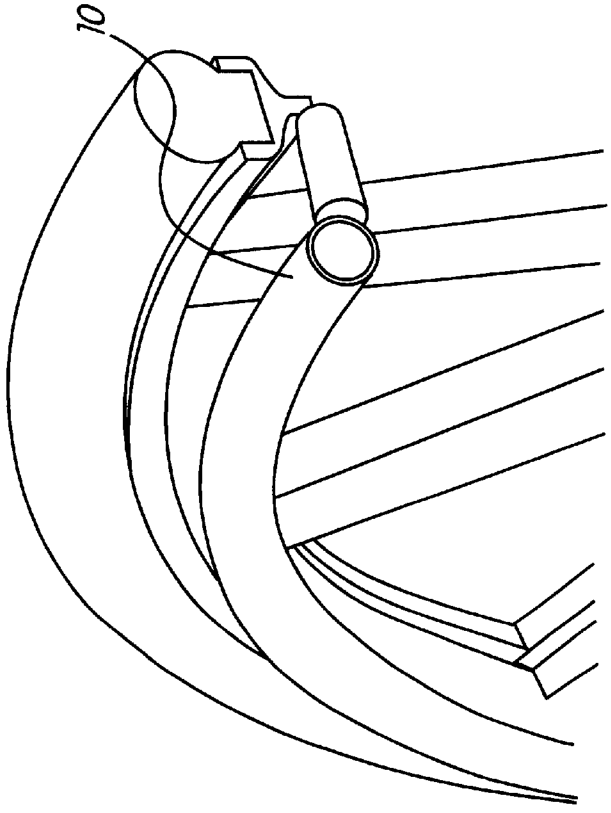
FIG. 3*a* is an oblique sectional view of a standard wheelchair.
Figure 3B:
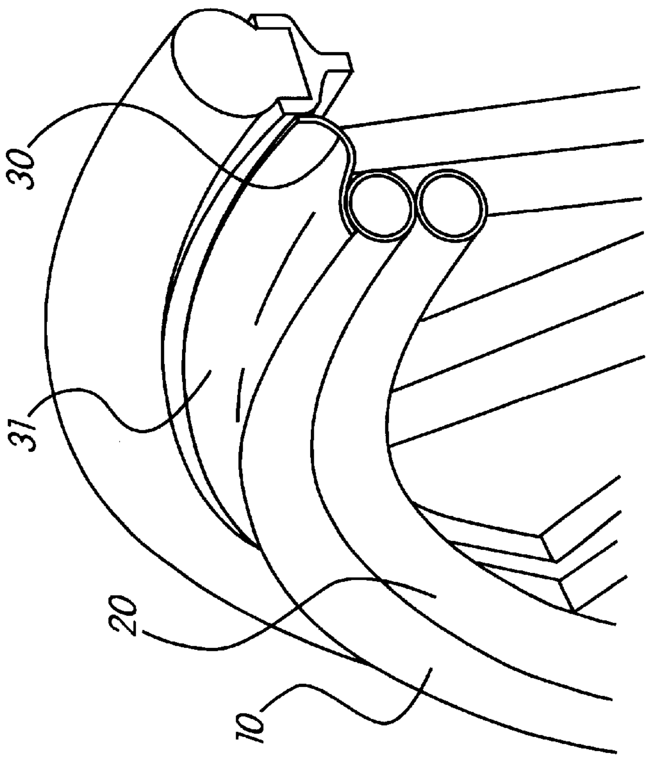
FIG. 3*b* is an oblique sectional view of a first preferred embodiment.

In contrast to existing pushrims, the present invention possesses a concave trough, 30, between the rim and the side of the wheel. In a first preferred embodiment, shown in FIGS. 2*a* and 2*b*, the pushrim is made from light weight tubing, e.g., aluminum, and has similar dimensions to a standard pushrim in tube diameter, overall rim diameter, and spacing between the rim and the hub of the wheel, 32. In this first embodiment, the invention also possesses a second uncoated rim, 20, located concentrically inside the first rim, 10, yet having a smaller overall diameter, 22. In an even more preferred first embodiment, in addition to the concave trough and second uncoated rim, the invention has a thin layer of high friction vinyl coating, 31, on the top portion of the rim, as shown in FIG. 2*b* and FIG. 3*b*.

Figure 4:
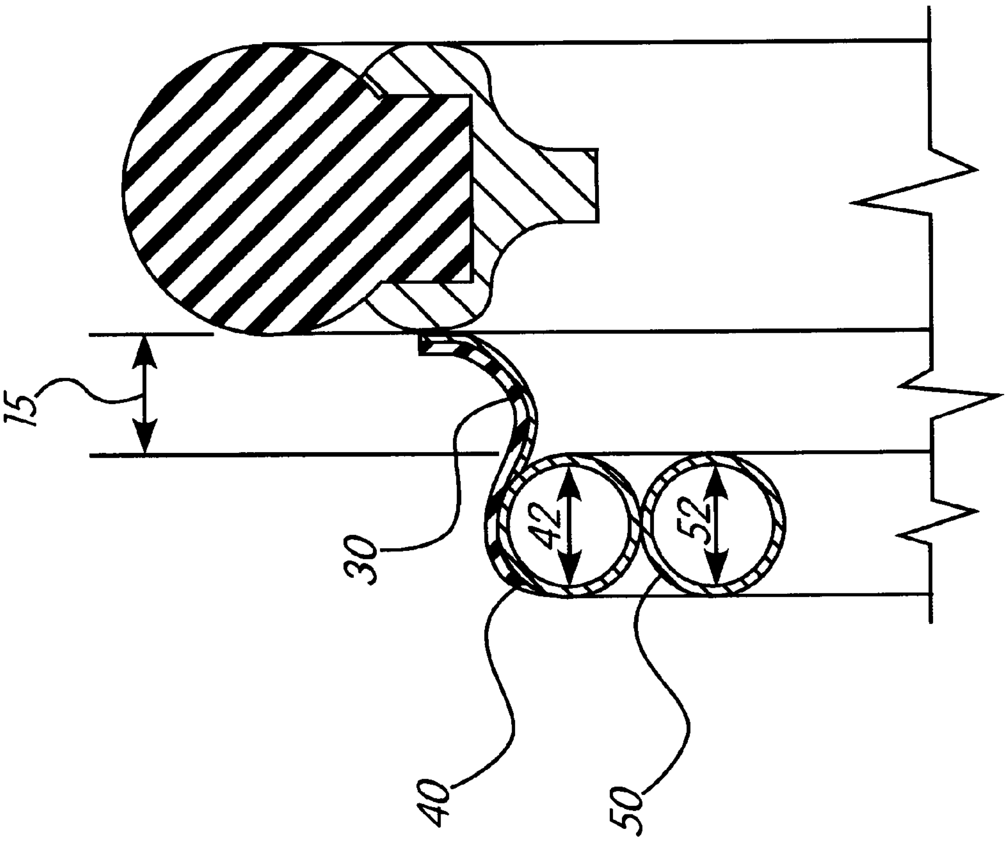
FIG. 4 is a cross section view of a second preferred embodiment.

In a second preferred embodiment, see FIG. 4, the invention has a concave trough, 30, between a first rim, 40, and the side of the wheel and second uncoated rim, 50, located concentrically inside the first rim, but the diameter of the tubes of the first and second rims, 42 and 52 respectively, is larger than those found in standard wheelchairs (e.g., 1"), and the distance between the second rim, 15, and the side of the wheel is greater than that of a standard wheelchair. See FIG. 4. In an even more preferred second embodiment, in addition to the foregoing features, the invention has a thin layer of high friction vinyl coating on the top portion of the rim as shown in FIGS. 2*b* and 3*b*.

Figure 5B:
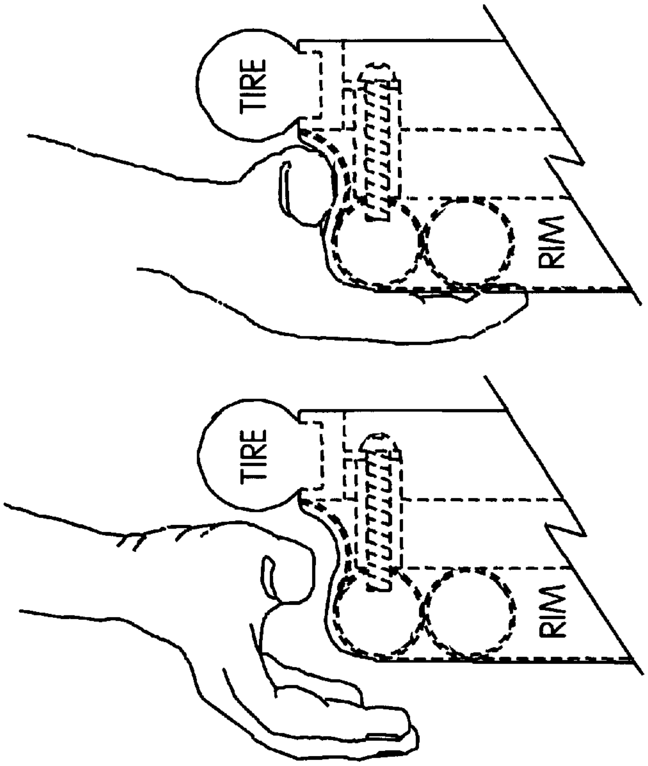
FIG. 5*b* is a cross section view of a second preferred embodiment with a schematic representation of the positioning of a hand.
Figure 5A:
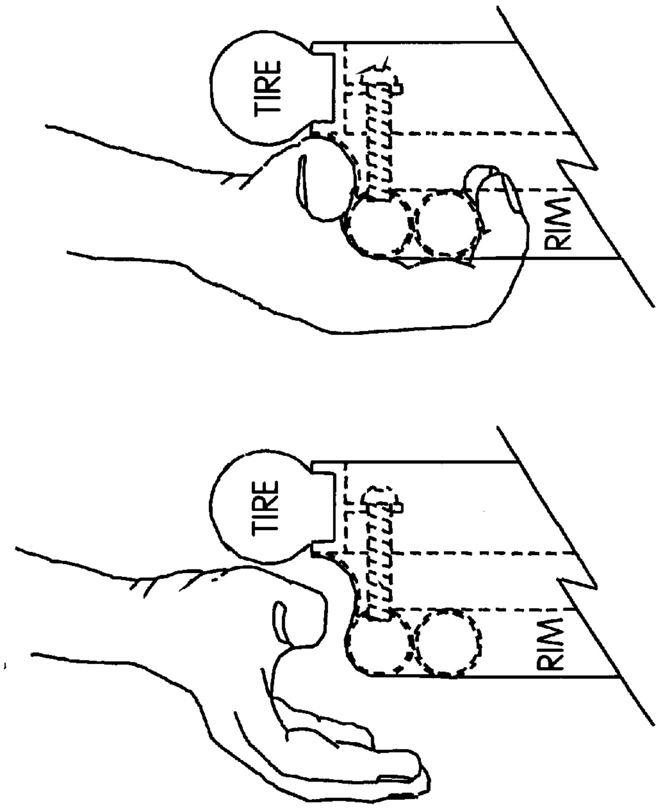
FIG. 5*a* is a cross section view of a first preferred embodiment with a schematic representation of the positioning of a hand.

One of the advantages of the present invention is that the shape and size of the rim provide improved contact area for the hand. This offers a better interface between the hands and the wheelchair. In the first preferred embodiment, the shape of the present invention eliminates the size discrepancy between the hand and the pushrim without altering the overall dimensions of the wheelchair. The addition of the concave trough and the inner rim yield a gripping surface more contoured to the shape of the hand, as shown in FIG. 5*a*. The trough increases contact surface area around the thumb while the standard and inner rims yield a larger contact surface for the palm while the fingers flex and grip the rim. These two features yield a larger contact gripping surface, which has been shown to increase mechanical efficiency and to be well accepted among MWUs (Gaines et al "Users' Responses to Contoured Wheelchair Handrim" Journal of Rehabilitation Research and Development; Vol. 23, No. 3 (1986), van der Linden et al "The Effects of Wheelchair Handrim Tube Diameter on Propulsion Efficiency and Force Applications IEEE Transactions on Rehabilitation Engineering; Vol. 4, No. 3 (September 1996)). Further, the larger grip surface decreases trauma to the hand and wrist during activities requiring large wrist motions and finger flexion activity which occurs in wheelchair propulsion (Frasson et al "Hand strength: the influence of grip span and grip type" Ergonomics; Vol. 34, No. 7 (1991)). Significantly, the first preferred embodiment offers a larger grip surface without widening the wheelchair which may cause accessibility and maneuverability problems.

Another advantage of one of the embodiments of the present invention is that it offers a high and low friction surface for propulsion and breaking. Currently, almost all standard pushrims are made from aluminum. Many are coated with a smooth anodized finish. Although this type of smooth surface is good for breaking without trauma to the hands, it requires greater grip force and stabilization from the arms during propulsion to compensate for the low contact friction. Some have attempted to address the smooth surface problem by using a high-friction vinyl coated pushrim. The vinyl-coated rims are popular among a subset of MWUs due to the increased mechanical advantage the added friction offers. Studies have shown that the vinyl-coated rims significantly decreased overall propulsion forces and the forces required for hand stabilization during a propulsive stroke (Koontz et al). However, the high friction of the vinyl also results in repeated trauma to the hand during breaking. Further the vinyl coating often peels or is stripped off from collisions with obstacles which also results in trauma to the hands.

A preferred embodiment of the present invention has the advantage of a high-friction surface for propulsion but a decrease in the complications with hand trauma and pushrim durability with a separate, smooth breaking surface. By applying the vinyl coating on only the top of the pushrim, MWUs can propel on the vinyl surface as they normally do and use the smooth side and inner rim surface to stop their chair. Further, by coating only the top portion of the rims with the vinyl, it will not be peeled or stripped off by side collisions with obstacles. The addition of the vinyl coating biomechanically reduces the chances of developing CTS due to increased mechanical efficiency and decreased forces.

Another advantage of the present invention is that it requires minimal changes to the wheelchair and aesthetically is similar to existing pushrims. Although there are several other commercially available propulsion assist devices such as gloves and lever-crank devices, most are not well accepted by MWU's. Gloves, for example, are used by some MWUs, but are not widely accepted because they are not aesthetic and are inconvenient. Propulsion aides that add on to the wheelchair often require changes to the wheelchair itself that change the feel or look of the chair. In some cases, the propulsion aides may not fit on the wheelchair. The present invention offers an alternative that MWUs could quickly place on their wheelchairs with minimal effort and minimal changes to the wheelchair.

The second preferred embodiment is preferred by MWUs with large hands and with quadriplegia. Because these individuals often cannot grip standard pushrims alone, they develop a technique in which they grip or press on the wheelchair tires and rims at the same time to increase the contact area. Although this technique increases the power transmission for propulsion, it is difficult to maintain during slippery conditions and the tire tread can cause trauma to the hand. The second preferred embodiment addresses this problem while providing a better fit to the hand and a larger high-friction contact area. See FIG. 5*b*.

The present invention is an alternative to daily standard wheelchair pushrims used by MWUs. The advantages of the present invention include increased mechanical efficiency, decreased required propulsion forces, and ergonomic shape which results in fewer arm injuries. Another immediate advantage is that the present invention offers a better fit to the hand during propulsion and reduces the effort required in everyday propulsion. The first preferred embodiment can easily replace current standard pushrims because the dimensions are very similar and do not add width to the wheelchair. The second preferred embodiment may also replace standard pushrims for people with larger hands or needing greater surface contact area. People with quadriplegia and people with attenuated grip strength will benefit from the new rims because the added propulsion surface would allow them to increase their mechanical efficiency while decreasing chances of injury to their hands with the separate breaking surface.

What is claimed is:

1. A wheelchair pushrim, comprising:

a first rim made of a first light weight metal tube without any coating on said first rim's lateral surfaces or radially inwardly facing surface;

a concave trough between said first rim and the side of a wheelchair; and a second rim made of a second light weight metal tube without any coating on said second rim, wherein said second light weight metal tube and said first light weight metal tube have equal diameters, and said second rim is concentrically aligned inside said first rim.

2. The invention of claim 1 wherein said first rim has a thin layer of high friction vinyl coating on its exterior circumference.

3. The invention of claim 1 wherein a thin layer of high friction vinyl coating exists on the exterior circumference of said first rim and on the exterior circumference of said trough.

4. The invention of claims 1, 2 or 3, wherein said first rim has a diameter substantially that of the rims of standard commercially available wheelchairs, said first and second light weight tubes have a diameter substantially that of the tubes of standard commercially available wheelchairs, and said first and second rims are aligned a distance from a wheel of a wheelchair equal to the distance between a wheel and rim of a standard commercially available wheelchair.

5. The invention of claims 1, 2 or 3, wherein said first and second rims have a tube diameter of ¾ inch, said first and second rims are ½ inch or ⅝ inch away from a wheel of a wheelchair, and said first rim has a 21 inch exterior diameter.

6. The invention of claims 1, 2 or 3, wherein the diameter of said first and second light weight tubes said first and second rims is greater than that of standard commercially available wheelchairs.

7. The invention of claims 1, 2 or 3, wherein the diameter of said first rim is greater than that of standard commercially available wheelchairs.

8. The invention of claims 1, 2 or 3, wherein the diameter of said first and second light weight tubes is greater than that of standard commercially available wheelchairs, the diameter of said first rim is greater than the rim diameter of standard commercially available wheelchairs, and wherein the distance of said first and second rims is greater than the distance between the rim and wheel of a standard commercially available wheelchair.

* * * * *